United States Patent [19]

Veronesi et al.

[11] Patent Number: 4,786,461
[45] Date of Patent: Nov. 22, 1988

[54] REACTOR INTERNALS HOLD DOWN SPRING

[75] Inventors: Luciano Veronesi, O'Hara Township, Allegheny County; Stephen N. Tower, Washington Township, Westmoreland County, both of Pa.

[73] Assignee: Westinghouse Electric Corp., Pittsburgh, Pa.

[21] Appl. No.: 538,040

[22] Filed: Sep. 30, 1983

[51] Int. Cl.$^4$ ............................................. G21C 13/02
[52] U.S. Cl. .................................... 376/285; 376/205; 376/399
[58] Field of Search ............... 376/203, 205, 243, 285, 376/302, 347, 361, 362, 264, 461, 377, 389, 390, 399, 400, 463

[56] References Cited

U.S. PATENT DOCUMENTS

| | | | |
|---|---|---|---|
| 2,982,713 | 5/1961 | Sankovich et al. | 376/205 |
| 3,070,527 | 12/1962 | Hurford et al. | 376/391 |
| 4,096,023 | 6/1978 | Anthony | 376/285 |
| 4,097,332 | 6/1978 | Gibbons et al. | 376/364 |

Primary Examiner—Deborah L. Kyle
Assistant Examiner—Richard L. Klein
Attorney, Agent, or Firm—H. Diamond

[57] ABSTRACT

Disclosed is a reactor internals hold down spring and upper head region cooling passage. The hold down spring utilizes a plurality of stacks of Belleville spring washers to provide spring load and deflection capability to hold down the reactor vessel internals. Each spring assembly includes a generally leak tight means for passing an adjustable coolant flow to the upper reactor vessel head region in order to maintain that region at inlet coolant temperature. The spring assemblies are angularly spaced about a core barrel support flange to cooperate with coolant flow passage formed therein.

15 Claims, 4 Drawing Sheets

REACTOR INTERNALS HOLD DOWN SPRING

BACKGROUND OF THE INVENTION

1. Field of the Invention

The present invention relates to hold-down springs for holding nuclear reactor internals firmly in place and more particularly to Belleville type spring assemblies for clamping upper and lower reactor internals inside of a reactor vessel while providing a coolant flow path to the reactor vessel head region.

2. Description of the Prior Art

Nuclear reactor cores are usually supported within a cylindrical core barrel arranged within a reactor vessel as a liner and hung from a flange formed where the reactor vessel and reactor vessel head are joined. The core and core barrel are commonly referred to as the lower internals. Coolant flows into the reactor vessel into an inlet annulus and is directed towards the bottom of the core barrel and then up through the core. During operation, the coolant is heated by the core. The heated coolant is then discharged from the reactor vessel as working fluid. Generally, a large pressure differential exists across the core which results in a very large "sailing" or lifting force against the core. This force actually tends to displace the core and its supporting structure. Positioned above the core in the pressure vessel are components known as the upper internals through which the heated coolant may pass before exiting from the pressure vessel. The upper internals are usually contained in a second cylindrical barrel axially aligned above the core barrel. The heated coolant, when passing through the upper internals, exerts a very considerable force against those components as well.

In most pressurized water reactor (PWR) constructions, the upper internals barrel is also supported from the flange formed where the reactor vessel and reactor vessel head are joined. Because of the large size of the structures involved and the significant thermal gradients which exist in the reactor vessel, axial and radial differential expansions occur at the assembly of the vessel and core components. Because of these differential expansions and in large mechanical and hydraulic forces discussed above which act on these structures, the assembly must provide a large enough force to resist displacement.

In addition, it is desirable to maintain the reactor vessel head region at inlet temperatures for safety reasons and to cool the upper internals drive components. Such cooling could only be achieved with a complex system of flow passages with prior designs which utilized a single large Belleville spring to provide a spring load and deflection capability for holding core barrel and upper internals barrel against deflection.

With a large Belleville spring, a clamping load is developed when the reactor vessel head is lowered onto the Belleville spring and drawn down by head studs onto the reactor vessel flange. The spring is typically deflected on the order of only about 0.150 inch resulting in about 460,000 pounds of force to clamp the upper and lower internals against a machined ledge on the inside of the reactor vessel flange. Such loading is sufficient to prevent significant upward motion of the internals during normal operation and during seismic or LOCA events.

However, with large (in the range of 14 to 16 foot diameter) Belleville springs, the loading force is developed over a very short deflection and therefore requires considerable precision. Moreover, large precision machined springs are expensive, difficult to heat treat and, because of their size and shape, difficult to handle, ship and replace. Moreover, with large springs a high stress is developed in the spring over a relatively small deflection which renders its performance vulnerable to stress relaxation after which replacement may be required to maintain adequate loading forces. Replacement is difficult not only because the spring is large but also because it is typically coated with a radioactive crud. Moreover, the size of a single spring is such that the replacement spring must come through a large hatch in the reactor containment resulting in long down times for the reactor.

Moreover, many of the prior large spring designs comprised a 360° structure which required a complex system of flow passages in order to pass inlet coolant to the upper head region. It should be understood that flow rates of up to 16,000 GPM (or on the order of 4% of the inlet flow) have to be accommodated.

Disclosed in U.S. Pat. No. 4,096,034 is a structure for clamping a core barrel and upper internals band against hydraulic displacement by using a few, large Belleville spings mounted in vertical alignment with the wall of the upper internals barrel. No provision is made in the disclosed hold down structure for a Belleville spring assembly which permits an adjustable coolant flow to the upper reactor vessel head region.

SUMMARY OF THE INVENTION

It is therefore an object of the present invention to provide a reactor vessel having an inexpensive, testable, and easily replaceable spring assembly for holding reactor internals.

It is a further object of the invention to provide a reactor vessel assembly including hold down springs having a flow passage for introducing coolant to the upper reactor vessel region.

It is a further object of the present invention to provide a hold down spring assembly design for reactor vessels which is inexpensive, easily tested and easily replaced and which conservatively meets all application requirements.

According to the invention, a nuclear reactor is provided which comprises a reactor pressure vessel and a lower internals assembly positioned within the reactor pressure vessel. The lower internals assembly has a core barrel with a flange having a plurality of annularly spaced coolant passages extending therethrough. An upper internals assembly is positioned within the reactor pressure vessel. The upper internals assembly includes an upper internals barrel having a flange which is axially disposed above the core barrel flange. The upper internals barrel flange has a plurality of annularly spaced core passages which, when the upper internals and core barrels are assembled, align with the coolant passages in the core barrel flange.

A plurality of reactor internals hold down spring assemblies are annularly spaced about the core barrel flange between the core barrel and upper internals barrel flanges. In accordance with the invention, the hold down spring assemblies comprise a retainer having a central bore therein. The retainer carries a resilient biasing means, preferably a stack of Belleville springs. A passage means is disposed in the central bore for defining a flow passage between the coolant passages in the core barrel and upper internals barrel.

Preferably, the core barrel and pressure vessel form an inlet coolant flow annulus in fluid communication with the coolant passages in the core barrel. The upper internals barrel and pressure vessel form an upper head region in fluid communication with the coolant passages in the upper internals barrel. In this manner, coolant from the inlet annulus flows through the core barrel coolant passages, the connecting flow passages, the upper internals barrel coolant passages, and to the upper head region of the reactor.

Advantageously, the means defining a connecting coolant passage may comprise a bellows flange having an opening and fixed at one end of the central bore. A spring bellows is carried by the bellows flange and is disposed within the central bore. A movable plunger having a central opening is carried by the spring bellows, the plunger being adapted to be biased against one of the core barrel coolant passages by the spring bellows.

Preferably, the retainer has an upper flange, adapted to seat against the upper internals flange, the upper flange being dimensioned to retain the stack of Belleville springs on the retainer when the stack is seated against the core barrel flange to resiliently support the upper internals barrel.

Preferably, the plunger has a generally spherical end portion and the core barrel coolant passages have cone shaped seating surfaces. The spherical ends are biased against the seating surfaces by the bellows spring in order to effect a generally fluid tight seal therebetween.

Advantageously, the upper bellows flange carries a central tube disposed within the spring bellows which extends toward but does not contact the plunger.

Advantageously, the hold down spring assemblies include a locking nut adapted to cooperate with the retainer to preload the stack of Belleville springs.

In another embodiment, the means defining a connecting coolant passage preferably comprises a first movable plunger which has a central opening and is movably retained within one end of the central bore and a second movable plunger having a central opening and which is movable within another end of the central bore. A spring bellows is disposed between the first and second plungers and within the central bore in order to bias the first and second plungers against the upper internals barrel and core barrel coolant passages respectively.

In another advantageous embodiment of the invention, the core barrel flange is preferably formed of increased thickness and the spring assemblies are inserted in a cylindrical counter bore formed in the core barrel flange about the first plurality of coolant passages. This embodiment eliminates the need for shims or travel limiters in the pressure vessel assembly.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

The accompanying drawings, which are incorporated in and form a part of the specification, illustrate several preferred embodiments of the present invention and together with the description, serve to explain the principles of the invention. Similar elements in the various drawings are similarly numbered. In the drawings.

DESCRIPTION OF THE PREFERRED EMBODIMENTS

Figure 1:
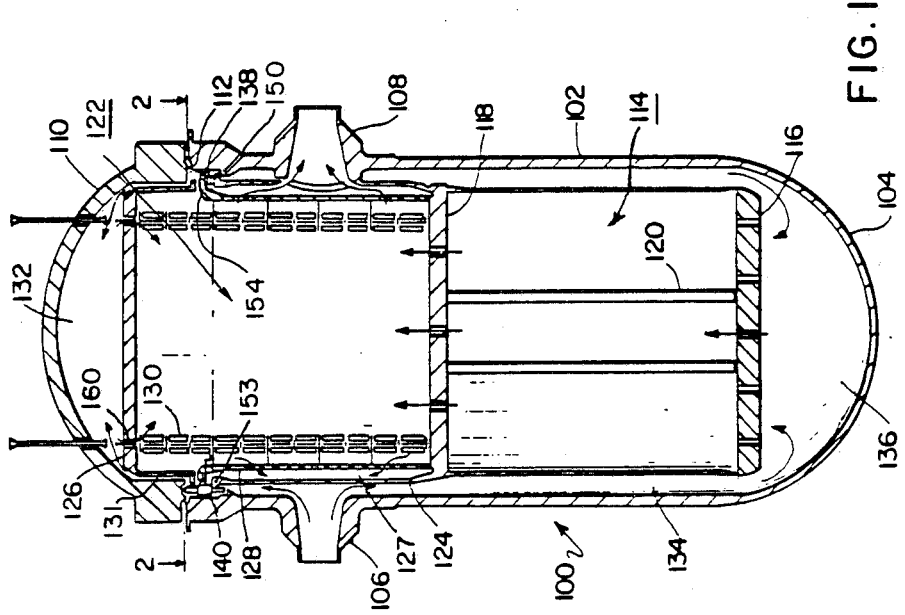
FIG. 1 is an elevation in longitudinal section through a reactor vessel illustrating the coolant flow.

Reference will now be made in detail to the present preferred embodiments of the invention, examples of which are illustrated in the accompanying drawings. Turning first to FIG. 1, there is depicted a nuclear reactor pressure-vessel assembly 100. The assembly comprises a reactor pressure vessel 102 which, in the illustrated embodiment, is a generally cylindrically shaped vessel closed at one end by a generally hemispherically shaped end portion 104. The vessel 102 has a coolant inlet 106 and a coolant outlet 108 formed therein to circulate coolant through the vessel. As viewed in FIG. 1, the top end of the vessel 102 is closed by a reactor pressure-vessel head 110 which sits on a flange portion 112 of the vessel 102.

A lower internals assembly 114 is supported within the vessel 102 and hung from the flange 112. The lower internals assembly comprises a perforated lower core support plate 116 and a perforated upper core support plate 118. The lower internals are used to support an array of fuel rod assemblies 120, two of which are illustrated in FIG. 1 by way of example.

Positioned axially above the lower internals assembly 114 in the reactor pressure vessel 102 is the upper internals assembly 122. The upper internals assembly is generally disposed within the core barrel 124 of the lower internals assembly 114 and also hung from the flange 112. The upper internals assembly 122 comprises a hat-shaped upper internals top plate 126 and a perforated upper internals barrel 128 disposed within the core barrel 124 and forming an annulus 127 therewith. As illustrated in FIG. 1, the upper internals assembly 122 contains a plurality of control rod guide structure assemblies 130, only two of which are illustrated for clarity. The guide structure assemblies 130 pass through the upper internals top plate 126 forming an annulus therewith through which coolant in the upper head region 132 can pass into the upper internals.

Coolant flows into the reactor pressure vessel through the coolant inlet 106. Most of the coolant flows through the inlet annulus 134 and towards the bottom region 136 of the vessel. The coolant then flows up through the perforated lower core support plate 116 and is heated to working temperatures while passing through the lower internals. The coolant then flows through the upper internals, the perforated upper internals barrel and out through the coolant outlet 108.

As will be appreciated by the artisan, the rate of coolant flow in a large reactor is tremendous and the forces exerted by the coolant against the upper and lower internals structure as it flows therethrough tends to displace those structures causing vibrations and the like.

A small portion of the coolant flows to the upper head region 132 through the annulus 127 and a coolant flow passage 158 (FIG. 4), described in detail below, which is provided in the Belleville spring assembly 138 of the present invention. The coolant flowing into the head region 132 serves the important safety function of maintaining the control rod drive mechanism components which pass through the upper head region at coolant inlet temperatures.

Figure 2:
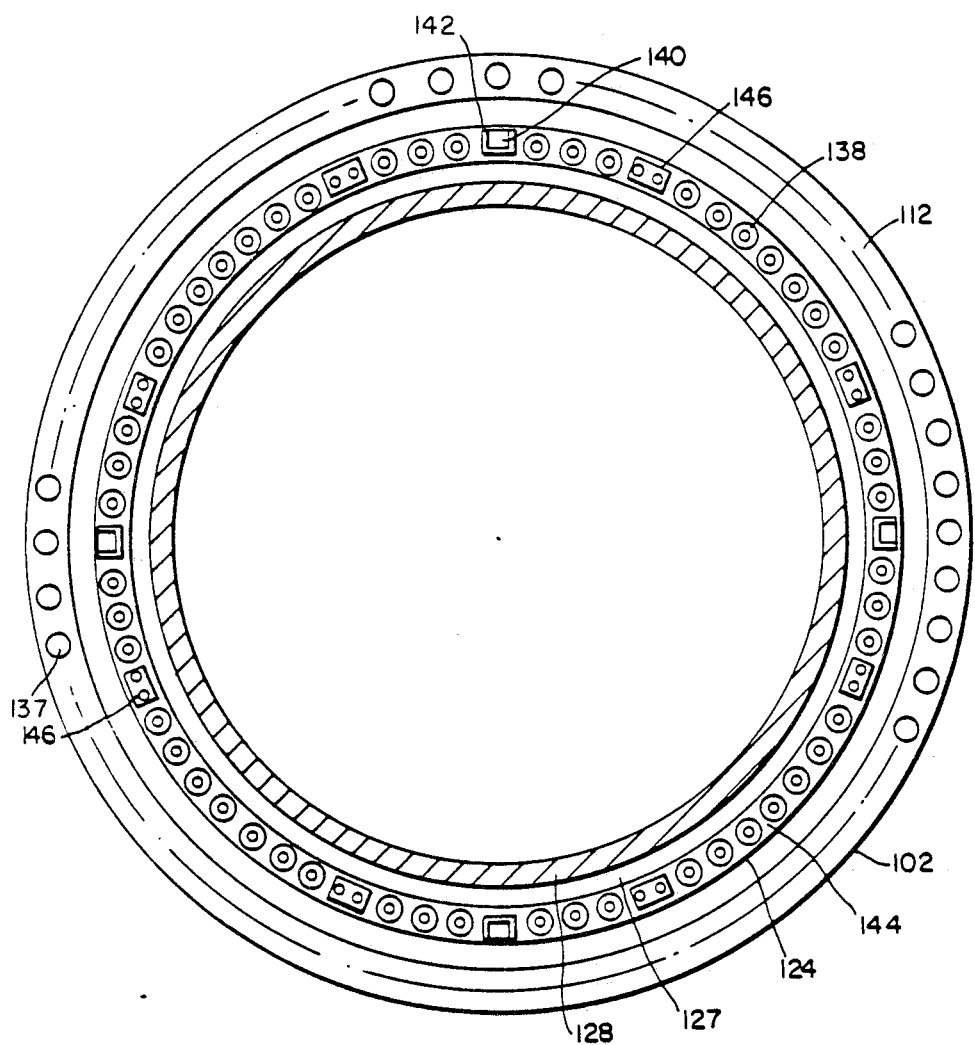
FIG. 2 is a view in section through section lines 2—2 of FIG. 1, illustrating the hold down assembly layout.

Turning now to FIG. 2 there is illustrated a sectional view of the pressure vessel of FIG. 1 omitting the reactor internal details for clarity. As can be appreciated from FIG. 2, a plurality of stud holes 137 are axially spaced about the pressure vessel flange 112 for accommodating stud bolts or the like used to fasten the pressure vessel head 110 to the pressure vessel 102.

A series of alignment keys slots 142 are formed in the core barrel 124. In the embodiment illustrated the alignment keys slots are rectangular in shape and each is operable to accommodate a key member 140 (FIG. 1) in order to at least grossly align the core barrel 124 and the pressure vessel 102. As will be appreciated from FIG. 2, a plurality of Belleville spring assemblies 138 are angularly spaced about the flange 144 of the core barrel 124. Each of the assemblies 138, which are described in detail below, are relatively small and have a large deflection capability. Consequently, they require less precision in design and manufacture than a single large Belleville spring or a few large spring assemblies. Moreover, the small Belleville spring assemblies 138 are easily replaced when necessary and can be easily handled, inspected and decontaminated. The small hold down spring assemblies 138 represent a significant cost savings, both in terms of reactor construction and maintenance, over prior art spring assemblies.

In the embodiment of FIG. 2, a plurality of shim members 146 are provided to limit the amount of travel of the upper internals band with regard to the core barrel. As clearly seen in FIG. 2, the Belleville washer assemblies 138 are positioned on a flange 144 of the core barrel 124 and the shims 146 are dimensioned to prevent the spring assemblies from over deflection or collapse in case of a seismic event or the like by limiting the maximum allowable deflection of the Belleville spring assemblies 138.

Figure 3:
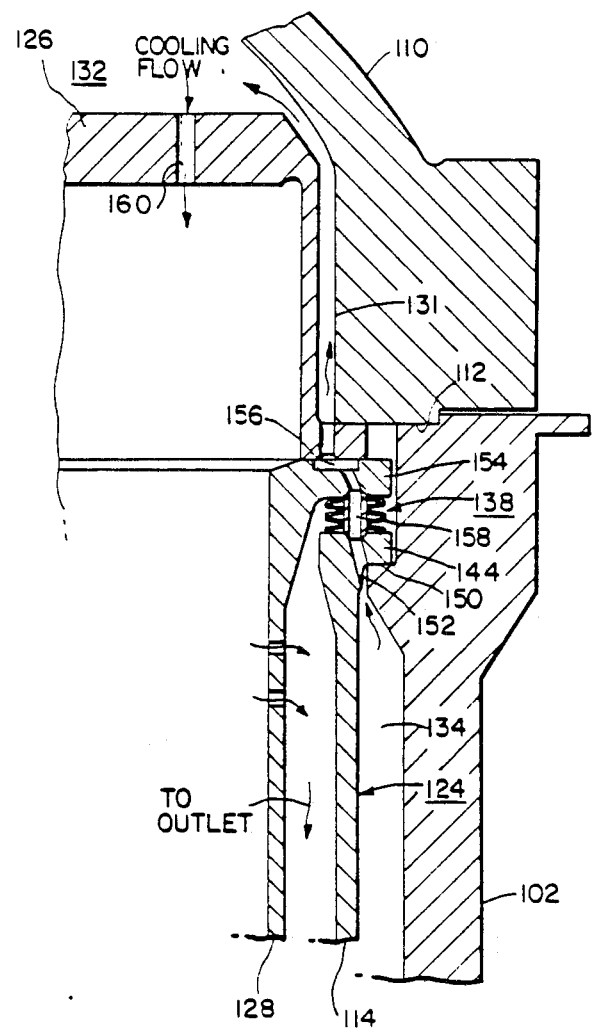
FIG. 3 is a fragmentary section illustrating enlarged a portion of the reactor vessel of FIG. 1 in the region surrounding the Belleville spring assembly.

Turning now to FIG. 3, there is depicted in greater detail a section of the reactor vessel assembly of FIG. 1 in the vicinity of a Bellevile spring assembly 138 indicating reactor coolant flow directions. All upper internals components are omitted for clarity. The core barrel 124 has a flange 144 that sits on a ledge 150 formed along the inside circumference of the reactor vessel 102. A coolant flow passage 152 is formed through the core barrel flange 153 at the site of the Belleville spring 138. The upper internals barrel 128 includes flange 154 which is dimensioned to sit axially above the core barrel flange 144. The flange 154 has a plurality of coolant passages 156 angularly spaced to align with the passages 152 when the core barrel and upper internals barrel are assembled in the pressure vessel. As best seen in FIG. 3, each Belleville spring assembly 138 is disposed between the upper internals barrel flange 154 and core barrel flange 144 and has a connecting coolant flow passage 158 aligned with the passages 152 and 156, thus providing a continuous passage for inlet coolant in the annulus 134 to flow into the upper head region 132 via an upper head annulus 131 (FIG. 1) and then through a small annulus formed in the drive rod hole 160 when the drive rod mechanism (not illustrated) is in place. The upper internals barrel 128 is resiliently supported above and in coaxial alignment with the core barrel 114 by the annularly spaced plurality of Belleville spring assemblies 138 and alignment keys 140.

Figure 4:
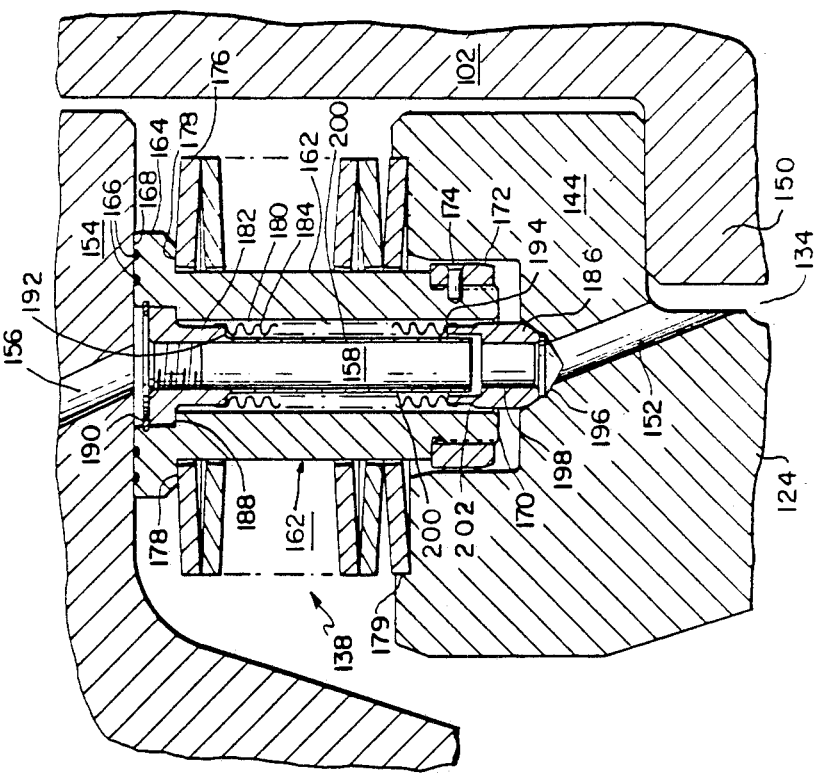
FIG. 4 is a fragmental view in longitudinal section of a first embodiment of a Belleville spring assembly according to the present invention.

Turning now to FIG. 4, there is illustrated a first preferred embodiment of a Belleville spring assembly according to the present invention. Each spring assembly 138 comprises means for carrying a stack of Belleville springs. Such means may comprise a central retainer 162, preferably having an upper flange 164 which seats against the upper internals barrel flange 154. Grooves 166 may be cut into the sealing surface 168 of the flange 164 to improve the seal with the flange 154. The lower portion 170 of the retainer 162 is formed with a tapped length of reduced diameter for accommodating locking nut 172 which is used during the assembly of the hold down spring assembly 138 to preload the springs. A locking pin 174 or other similar fastening device is used to arrest the locking nut 172 on the central retainer 162.

Belleville springs 176 are stacked vertically on the retainer 162. As illustrated in FIG. 4, the Belleville springs may be stacked as single layers of opposing spring disks of alternating angular orientation or may be arranged in alternating and opposing groups of two or more spring disks of the same angular orientation. In either manner, a spring assembly is built up which, after assembly, bears against generally flat inner flange surface 178 of the retainer 162 and against the locking nut 172 with a set preload. If the retainer 162 is fabricated without a flange 164, an external snap ring or the like may be used to retain the spring disks. In the embodiment illustrated, the assembly comprises a stack of nine spring disks which, when compressed, exert a force of on the order of 20,000 pounds. If, for example, fifty spring assemblies are mounted on the core barrel flange 144, they will cumulatively exert a force of 1,000,000 pounds against the upper internals which is sufficient to fix the internals in place during normal and accident conditions. The stack of Belleville springs sits in a recess 179 formed in the flange 144. Positioned within a bore 180 of the retainer 162 is a means defining the connecting coolant passage 158 which comprises a bellows flange 182, a spring bellows 184 and a plunger 186. The bellows flange 182 seats against a shoulder 188 formed in the bore 180. A snap ring 190 or similar fastener holds the bellows flange in place in the bore 180. The bellows flange and plunger are provided with shoulders 192 and 194 respectively between which the spring bellows 184 is adapted to be retained. The compressed deflection of the spring assembly is typically in the range of about ½ to 1 inch depending upon the specific design chosen. This deflection, which is several times that of a large single Belleville spring, provides protection against unloading due to stress relaxation. With the present invention, a small deformation due to relaxation produces a small change in spring force whereas with the large Belleville spring the same deformation produces a large reduction in loading.

The difficulties in replacing a large Belleville spring were previously described. The small spring assemblies of the present invention weight on the order of 50 pounds and are therefore easily handled. Decontamination and inspection of the small spring assembly is far easier and results in less man-rem exposure than is the case with large hold down springs.

Preferably, the core barrel cooling passage 152 is formed with a cone shaped seating surface 196 and the plunger 186 is formed with a spherical end which seats against the surface 196 in a generally fluid tight manner under a bias from the spring bellows 194. The plunger 186 has a bore 198 which aligns with a tube 200 extending from the bellows flange 182. The tube 200 is dimensioned to fit within an expanded diameter section 202 of the plunger bore 198 and to be sufficiently spaced from the plunger bore to allow for spring assembly deflection. It will be appreciated that the coolant flow path from the passage 152 to the passage 156 is through the seat 196, the plunger 186 and the bellows flange tube 200. The spring bellows biases the plunger against the seating surface 196 and prevents any coolant flow past the tube 200 from dispersing into the upper internals.

Thus, basic design consists of employing multiple stacks of small Belleville springs arranged in a circle on the flange of the core barrel flange 144. The small Belleville springs have the configuration of a conical thick wall washer and are typically 7 to 10 inches in outside diameter with a center hole of 3½ to 4 inches diameter. Typically 5 to 10 small spring washers are stacked vertically and held together by the cylindrical retainer 162. The bore 180 in the center of the retainer provides space for the connecting flow passage generally 158 with its sealing and expansion accommodating features.

Figure 5:
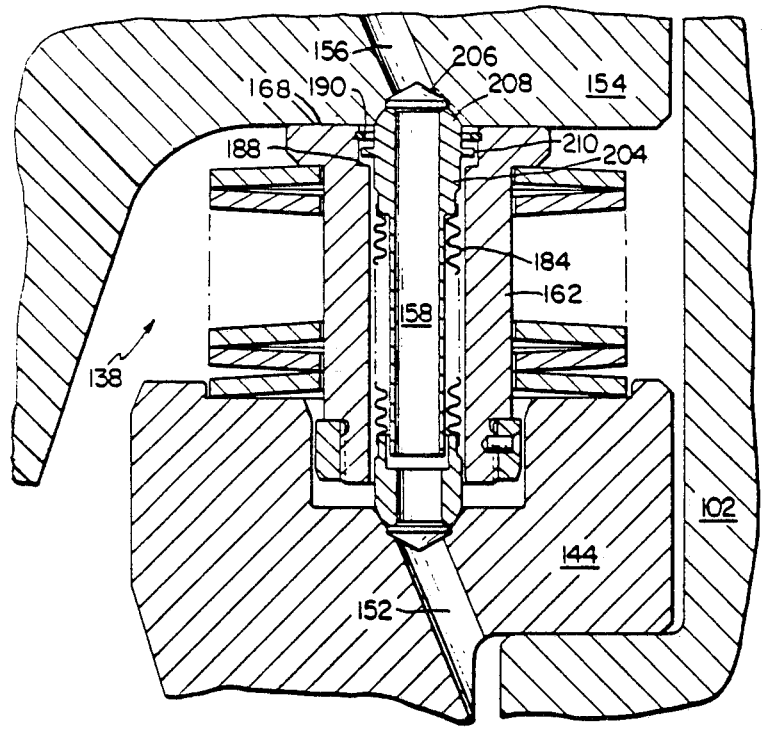
FIG. 5 is a fragmental view in longitudinal section of a second embodiment of a Belleville spring assembly according to the present invention.

Turning now to FIG. 5 there is illustrated a second embodiment of a Belleville spring assembly in accordance with the present invention. The only significant difference between the embodiments of FIGS. 4 and 5 is that an upper plunger 204 is used in lieu of the bellows flange assembly 182 of FIG. 4. The passage 156 is formed with a conical seating surface 206 similar to the surface 196 discussed above against which the generally spherical end 208 of the plunger 204 is biased by the spring bellows 184. The upper plunger 204 is formed with a retaining plate 210 which, after assembly, is restrained to move axially between the snap ring 190 and the shoulder 188 of the retainer 162. Thus, a flow passage is provided with improved sealing and expansion accommodation features. The connecting flow passage, generally 158, does not require leak tightness but it is desirable to minimize leakage between the coolant flow passage and the upper internals interior volume since such leakage will not contribute to head cooling and will reduce the reactor outlet temperature by dilution, and will add to the plant pumping lower load. The flow passage design of the spring assembly of either FIGS. 4 or 5 will achieve this goal. In the embodiment of FIG. 4, a single ball and cone seal 186, 196 is utilized at the bottom of the assembly. Leakage is limited at the top of the assembly by tight clearances between the retainer flange 168 and the upper internals barrel flange 154. The element is secured within the retainer by a snap ring. The embodiment of FIG. 5 is similar except that ball and cone seats are furnished at both ends of the flow element to further reduce bypass leakage.

As alluded to above, a typical spring assembly may be compressed ½ to 1 inch when it is installed for service. As a consequence the flow sealing arrangement must accommodate that movement. A single ply standard spring bellows 184 is preferably incorporated in the assembly to perform this function. The assemblies of the design of either FIGS. 4 or 5 provide a simple and inexpensive means for establishing and controlling a coolant flow to the pressure vessel head region 132. If it is desired to reduce the flow, members having reduced or valved bores can be inserted by removing the snap ring 190 and inserting an appropriately dimensioned element in lieu of the bellows flange 182 of FIG. 4 or the upper plunger 204 of FIG. 5.

Figure 6:
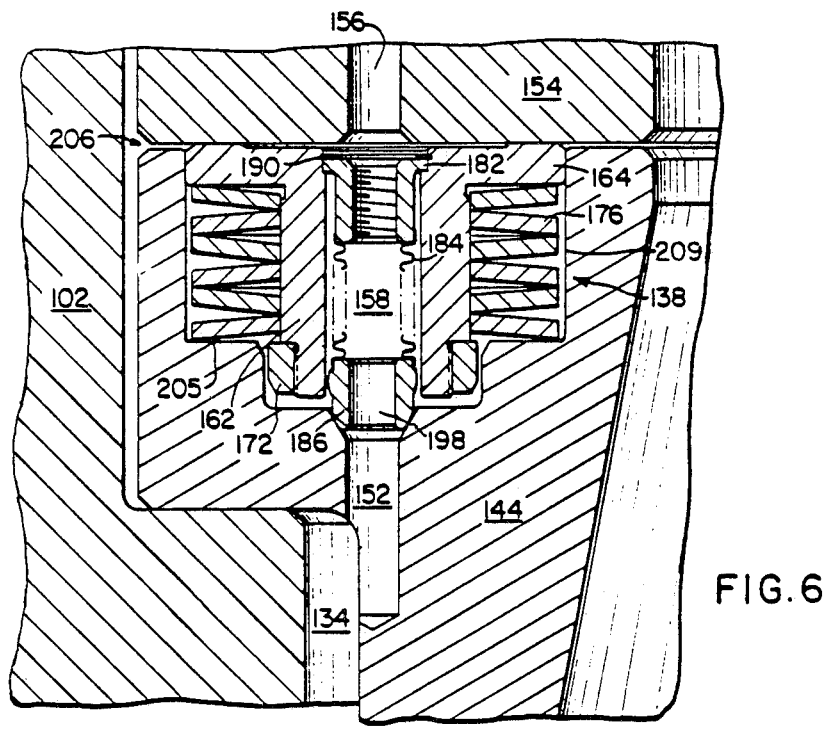
FIG. 6 is a fragmental view in longitudinal section of a third embodiment of a Belleville spring assembly according to the present invention.

In a third embodiment of the invention, illustrated in FIG. 6, a hold-down spring assembly 138 is disclosed intended for use in a pressure vessel assembly in which the travel limiting shims 146 of FIG. 2 have been omitted. In the embodiment of FIG. 6, the core barrel flange 144 has an increased axial thickness relative to the flanges of FIGS. 4 or 5 and the Belleville spring assemblies 138 are disposed in a generally cylindrically counter bore 209 formed in the flange 144 of the core barrel. This counter bore 209 has a shoulder 205 for supporting the Belleville spring stack. In this embodiment the flange not only supports the spring assemblies 138 but also functions to limit the maximum deflection of the assembly.

The spring assemblies of FIG. 6 are designed so that when the upper internals and core are loaded into the pressure vessel, the resulting deflection of the spring assemblies 138 produces a gap 206 between the flanges 154 and 144. If the springs are overloaded due to a seismic event or the like or due to stress relaxation, the maximum additional deflection is limited to a distance equal to the gap 206 after which the flanges 144 and 154 abut one another. The gap 206 is typically on the order of about 60 to 90 mils. Other elements of FIG. 6 are similar to the assemblies of FIGS. 4 and 5 and are not further described in detail.

As should now be appreciated, the spring assemblies of the present invention are relatively small and have a large deflection capability. In addition, the Belleville spring assemblies disclosed require less precise design and less manufacturing precision than a single or a few large spring assemblies. Consequently, the present invention can provide the required spring load and deflection capability at lower cost, afford easier replacement, handling, inspection and decontamination.

In addition, multiple small spring assemblies provide a degree of redundancy which tolerates some assembly failures. Moreover, the present spring assembly design provides a generally fluid tight flow path for upper head cooling using a flow passage which is easily replaceable and adjustable to change the reactor head cooling flow rate. Importantly, the present small spring assemblies can be load tested before installation which is almost impossible with very large spring assemblies. In addition, the small diameter of the spring assemblies reduces the required reactor flange diameter by 4.5 inches or more with a consequent savings of some 26,000 pounds or more in reactor vessel weight.

The foregoing description of the preferred embodiments of the invention have been presented for purposes of illustration and description. They are not intended to be exhaustive or to limit the invention to the precise form disclosed, and obviously many modifications and variations are possible in light of the above teaching. For example, the size and shape of the spring stacks, the various retaining means, and type of coolant passage connections used may be modified within the spirit and scope of the invention. It is intended that the scope of the invention be defined by the claims appended hereto.

We claim:
1. A nuclear reactor comprising:
a reactor pressure vessel;

a lower-internals assembly disposed within the reactor pressure vessel including a core barrel having a flange with a plurality of first annularly-spaced coolant passages;

an upper-internals assembly disposed within the reactor pressure vessel including an upper-internals barrel having a flange, axially disposed above said core-barrel flange, with a plurality of second annularly-spaced coolant passages;

each of said plurality of second passages being positioned to be in coolant-passage communication with a corresponding one of said plurality of said first passages;

a plurality of reactor-internals hold-down spring assemblies annularly-spaced about said core-barrel flange, each of said spring assemblies being disposed between said core-barrel flange and said upper-internals barrel flange and being associated with one of said plurality of second passages and said corresponding one of said plurality of first passages;

each said spring assembly comprising:
a resilient biasing device;
a retainer means for carrying said resilient biasing device and having therein a central bore; and
means, disposed in said central bore, for defining a connecting flow passage for coolant between a said second and said corresponding first coolant passages with which said each spring assembly is associated.

2. The nuclear reactor according to claim 1, wherein said resilient biasing device comprises a stack of Belleville springs carried on said retainer means.

3. The nuclear reactor according to claim 1, wherein the core barrel and pressure vessel form an inlet coolant flow annulus in fluid communication with the plurality of first annularly-spaced coolant passages, and wherein the upper-internals barrel and pressure vessel form an upper-head region in fluid communication with the plurality of second annularly-spaced coolant passages whereby coolant from said inlet coolant flow annulus flows through said plurality of first passages, the connecting flow passages, said plurality of second passages, and into the upper-head region.

4. A nuclear reactor comprising:
a reactor pressure vessel,
a lower-internals assembly disposed within the reactor pressure vessel including a core barrel having a flange with a plurality of first annularly-spaced coolant passages;

an upper-internals assembly disposed within the reactor pressure vessel including an upper-internals barrel having a flange, axially disposed above said core-barrel flange, with a plurality of second annularly-spaced coolant passages;

each of said plurality of second passages being positioned to be in coolant-passage communication with a corresponding one of said plurality of said first passages;

a plurality of reactor-internals hold-down spring assemblies annularly-spaced about said core-barrel flange, each of said spring assemblies being disposed between said core-barrel flange and said upper-internals barrel flange and being associated with one of said plurality of second passages and said corresponding one of said plurality of first passages;

each said spring assembly comprising:
a resilient biasing device;
a retainer means for carrying said resilient biasing device and having therein a central bore; and
means disposed in said central bore, for defining a connecting flow passage for coolant between a said second and said corresponding first coolant passages with which said each spring assembly is associated;

said defining means comprising:
a bellows flange, fixed at one end of said central bore, and having a central opening therein;
a spring bellows carried by said bellows flange and disposed within said central bore;
a movable plunger carried by said spring bellows and having a central opening therein; said plunger being biased by said spring bellows against the one of said plurality of first coolant passages with which it is associated.

5. The nuclear reactor according to claim 4 wherein the biasing device comprises a stack of Belleville springs and, wherein the retainer means has an upper flange seated against the upper-internals flange, said upper flange being dimensioned to retain a first side of said stack of Belleville springs, and a second side of said stack being seated against said core-barrel flange to resiliently support said upper-internals barrel.

6. The nuclear reactor according to claim 4, wherein the plunger has a generally spherical end and the one of the first plurality of coolant passages with which the defining means of which the plunger forms a part is associated has a generally cone shaped seating surface, said spherical end being biased against said seating surface by the spring bellows.

7. The nuclear reactor according to claim 4, wherein said bellows flange has a central tube disposed within said spring bellows extending towards said plunger.

8. The nuclear reactor according to claim 5 further including a locking nut connected to and cooperative with the retainer to preload the stack of springs.

9. The nuclear reactor according to claim 5, wherein a plurality of annularly-spaced counter bores are formed in the core-barrel flange about each of first coolant passages, each of said counter bores having a shoulder for supporting said stack of Belleville springs, said counter bore being dimensioned so that a gap is formed between the core-barrel flange and the upper-internals flange when the retainer flange is seated against said upper-internals flange, said gap defining the maximum allowable deflection of said Belleville spring stack.

10. A nuclear reactor comprising:
a reactor pressure vessel;
a lower-internals assembly disposed within the reactor pressure vessel including a core barrel having a flange with a plurality of first annularly-spaced coolant passages;

an upper-internals assembly disposed within the reactor pressure vessel including an upper-internals barrel having a flange, axially disposed above said core-barrel flange, with a plurality of second annularly-spaced coolant passages;

each of said plurality of second passages being positioned to be in coolant-passage communication with a corresponding one of said plurality of said first passages;

a plurality of reactor-internals hold-down spring assemblies annularly-spaced about said core-barrel flange, each of said spring assemblies being disposed between said core-barrel flange and said upper-internals barrel flange and being associated with one of said plurality of second passages and said corresponding one of said plurality of first passages;

each said spring assembly comprising:

a resilient biasing device;

a retainer means for carrying said resilient biasing device and having therein a central bore; and means disposed in said central bore, for defining a connecting flow passage for coolant between a said second and said corresponding first coolant passages with which said each spring assembly is associated;

said defining means comprising:

a first movable plunger, movably retained within one end of said central bore and having a central opening therein;

a second movable plunger movably disposed within another end of said central bore, and having a central opening therein; and a spring bellows disposed within said central bore and between said first and second plungers for biasing said first and second plungers against the second coolant passageway associated with said defining means and the corresponding one of the first coolant passageways in communication with said second coolant passages.

11. The nuclear reactor according to claim 10 wherein the biasing device comprises a stack of Belleville springs and, wherein the retainer has an upper flange to be seated against the upper-internals flange, said upper flange being dimensioned to retain a first side of said stack of Belleville springs, a second side of said stack being seated against said core-barrel flange to resiliently support said support internals barrel.

12. The nuclear reactor according to claim 10, wherein the first and second plungers have first and second generally spherical ends respectively and the associated second coolant passage and the first passage in communication therewith have generally cone shaped seating surfaces, said first and second spherical ends being biased against said second and first seating surfaces respectively by the spring bellows.

13. The nuclear reactor according to claim 11, wherein the first plunger has a central tube disposed within the spring bellows, said tube extending toward the second plunger.

14. The nuclear reactor according to claim 11 further including a locking nut connected to and cooperative with the retainer to preload the stack of springs.

15. A nuclear reactor comprising:

a reactor pressure vessel;

a lower-internals assembly disposed within said reactor pressure vessel, said assembly including a core barrel having a flange with a plurality of first annularly-spaced coolant passages;

an upper-internals assembly disposed within said reactor pressure vessel, said upper-internals assembly including an upper-internals barrel having a flange, axially disposed above said core-barrel flange, with a plurality of second annularly-spaced coolant passages;

each of said second passages being positioned to be in coolant passage communication with a corresponding one of said first passages;

a head secured to said vessel defining an upper-head region between it and said upper-internals assembly with said second passages in communication with said upper-head region;

a reactor hold-down spring assembly disposed between said core-barrel flange and said upper-internals barrel flange at each associated first and corresponding second passages between said flanges;

each said hold-down spring assembly having a bore in coolant communication between each associated first passage and the corresponding second passage;

an inlet nozzle in said pressure vessel; and means, connected to said inlet nozzle, for conducting the coolant flowing into said inlet nozzle to the upper-head region through said first and second passages and through said bore.

* * * * *